April 15, 1924.
D. H. HERBSTER ET AL
1,490,563
CLUTCH
Filed June 25, 1921
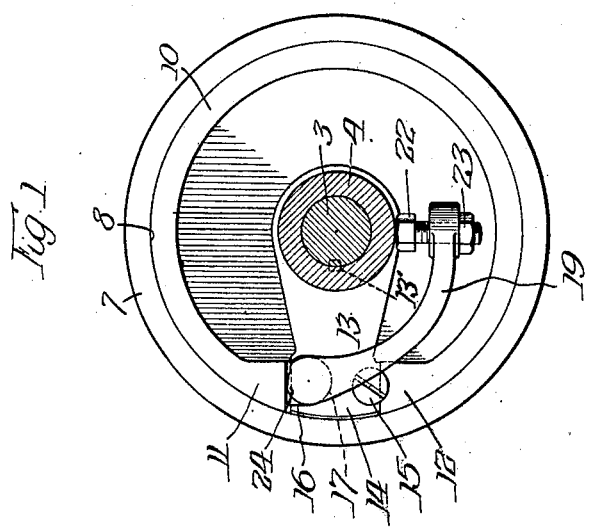
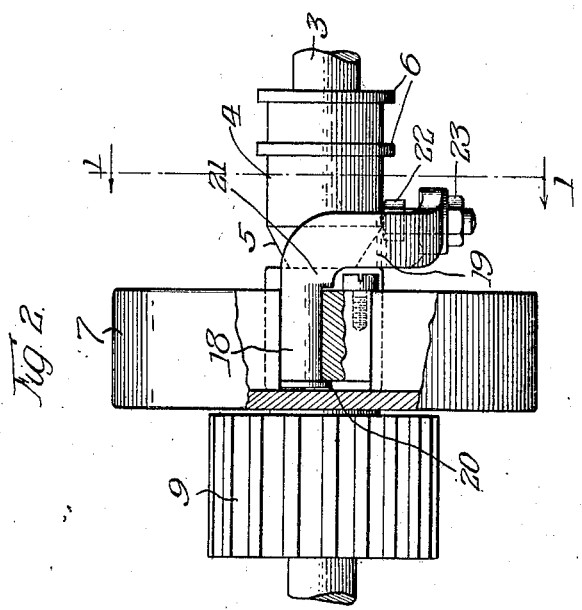
Witness:
P. Burkhardt
Inventors
Daniel F. Stair,
Daniel H. Herbster
By Wilkinson, Huxley, Byron & Knight
attys Patented Apr. 15, 1924.

1,490,563

UNITED STATES PATENT OFFICE.

DANIEL H. HERBSTER AND DANIEL E. STAIR, OF ELKHART, INDIANA, ASSIGNORS TO THE GODFREY CONVEYOR COMPANY, OF ELKHART, INDIANA, A CORPORATION OF INDIANA.

CLUTCH.

Application filed June 25, 1921. Serial No. 480,306.

*To all whom it may concern:*

Be it known that we, DANIEL H. HERBSTER and DANIEL E. STAIR, citizens of the United States, residing at Elkhart, in the county of Elkhart and State of Indiana, have jointly invented certain new and useful Improvements in Clutches, of which the following is a specification.

The present invention relates to a new and improved clutch, and more specifically to a friction clutch of the expanding type.

Clutches of this character are used in a variety of machines where a simple, quick-acting and effective clutch is desired. It is important that the clutch should be composed of but few parts and should be rugged in construction in order to undergo the heavy and continuous duty often imposed upon it. Simplicity is further desirable in that the clutch is often operated and cared for by unskilled persons.

Another highly desirable feature lies in an ability to quickly take down and reassemble the clutch in order that worn or defective parts may be replaced without keeping out of operation for long periods of time the machinery controlled by the clutch.

It is an object of the present invention to provide a clutch of this character which comprises but few and rugged parts, which is simple in design, and which is positive and effective in its operation.

It is also an object to provide a clutch which can be quickly dismantled and reassembled without necessitating derangement of other portions of the apparatus with which it is associated.

Other and further objects will appear as the description proceeds.

Broadly, our clutch comprises a free pulley having an inner clutch face, and an expanding clutch ring having an arm associated with the rotating shaft interposed between the split ends of the ring. This ring has a split of sufficient size so that it may be readily installed and removed by slipping it laterally onto or off the shaft. The clutch further comprises a removable retaining member carried by the arm and adapted to prevent displacement of the ring relative to the arm. The portion of the arm adjacent one end of the split ring is provided with a recess, the inner part of which is arcuate in contour. An actuating lever is provided having a portion fitted in the recess, this portion having the major part of its circumference formed upon the arc of the recess. This portion in one rotative position is entirely within the contour of the recess, and when rotated a part thereof passes out of the face of the recess to extend the ring. A lip and shoulder are provided engaging opposite faces of the arm to prevent displacement of the lever. The lever has an extended portion adapted to coact with an actuating cone on the shaft.

We have illustrated a preferred embodiment of our invention in the accompanying drawings, in which—

Figure 1 is a face view of the clutch taken on line 1—1 of Figure 2, the shaft and cone being shown in section; and Figure 2 is a side view of the clutch partly broken away to show the construction.

As shown in the figures, the shaft 3 has fitted slidably thereon the actuating member 4 having the cone face 5 and the shoulders 6 adapted to be engaged by an operating fork (not shown). The pulley 7 turns freely on the shaft 3 and is provided with the inner clutch face 8. As shown this pulley is rigidly connected to the pinion 9 which it may serve to drive or by which it may be driven. Fitting within the pulley is the split clutch ring 10 having the enlarged ends 11, 12. The distance between these ends is greater than the diameter of the shaft 3. The arm 13 which is keyed to the shaft 3 by the key 13' has its outer portion 14 interposed between the ends 11, 12 of the clutch ring. The portion 14 of the arm carries the screw 15, the head of the screw extending over and against the end 12 of the split ring. The face of the arm adjacent the end 11 of the ring is provided with a recess 16, the inner portion 17 of which is formed upon the arc of a circle. Fitting within this recess is the portion 18 of the actuating lever 19. This portion 18 as shown is provided with an arcuate face similar in radius to the arc of the recess 16. The portion 18 is provided with the inner lip 20 engaging the inner face of the arm 13 and with the shoulder 21 engaging the outer face of that arm. The lever 19 is provided with the contact screw 22 which may be locked in adjusted position by the lock nut 23.

In the use of the device, with the parts as shown in Figure 1, the ring 10 is brought into clutching contact with the pulley face 8. A movement of the cone member 4 inwardly engages the screw 22 and thus thrusts the end of the lever 19 outward. This movement serves to rotate the portion 18 and the edge 24 passes out of the contour of the recess 16 and thrusts against the end 11 of the split ring. This movement of this edge 24 in effect comprises an increase in circumferential extent of the portion 14 of the arm 13. There is an equal thrust against the end 12 of the split ring and the ring is thus expanded until it firmly grips the pulley. The pulley and shaft are then frictionally locked together and rotate as one.

To dismantle the clutch, the cone 4 is moved to permit the arm 19 to swing inwardly and the screw 15 may then be removed. The split ring 10 is then free to move axially of the shaft and may be slipped back and laterally off the shaft. Removal of the ring 10 frees the face of the portion 18 of the lever 19 and it may be moved laterally out of its recess in the member 13 and entirely removed. The clutch may thus be completely dismantled in a few minutes and without necessity for derangement of other structure. It may be quickly assembled by reversing the operations above described.

The clutch of our design is composed of but few parts and may be readily assembled and dismantled as needed. It is so simple in design that it may be readily understood, operated and cared for by unskilled labor.

We claim:

1. In an expanding clutch mechanism, a shaft, a pulley freely rotatable thereon and having an inner clutch face, a split clutch ring located about said shaft and within said pulley, an arm secured to said shaft and having its outer end interposed between the split ends of the clutch ring, a recess, a part of which is arcuate in contour, formed in a face of said arm adjacent the ring, a lever having a portion thereof formed upon the arc of said recess and fitting therein and having a portion extending adjacent said shaft, said recess and lever portion being so related that the lever may be moved laterally from the recess, and means slidably carried on the shaft and adapted to actuate the lever, movement of said lever serving to rotate the portion thereof in the recess and to cause a part thereof to move out of the recess against the split ring, thereby expanding the split ring and causing it to engage the pulley.

2. In an expanding clutch mechanism, a shaft, a pulley freely rotatable thereon and having an inner clutch face, a split clutch ring located about said shaft and within said pulley, an arm secured to said shaft and having its outer end interposed between the split ends of the clutch ring, a recess, a part of which is arcuate in contour formed in a face of said arm adjacent the ring, a lever having a portion thereof formed upon the arc of said recess and fitting therein, said portion having a lip engaging the inner face of the arm to prevent displacement therefrom, said recess and lever portion being so related that the lever may be moved laterally from the recess to clear the lip from the inner face of the arm, said lever further having a portion extending adjacent said shaft, and a cone slidably carried on the shaft and adapted to actuate the lever, movement of said lever serving to rotate the portion thereof in the recess and to cause a part thereof to move out of the recess against the split ring, thereby expanding the split ring and causing it to engage the pulley.

3. In an expanding clutch mechanism, a shaft, a pulley freely rotatable thereon and having an inner clutch face, a split clutch ring located about said shaft and within said pulley, an arm secured to said shaft and having the outer end interposed between the split ends of the clutch ring, a recess a part of which is arcuate in contour formed in a face of said arm adjacent the ring, a lever having a portion thereof formed upon the arc of said recess and fitting therein, said portion having a lip engaging the inner face and a shoulder engaging the outer face of the arm to prevent displacement therefrom, said recess and lever portion being so related that the lever may be moved laterally from the recess to clear the lip from the inner face of the arm, said lever further having a portion extending adjacent said shaft, and a cone slidably carried on the shaft and adapted to actuate the lever, movement of said lever serving to rotate the portion thereof in the recess and to cause a part thereof to move out of the recess against the split ring, thereby expanding the split ring and causing it to engage the pulley.

4. In an expanding clutch mechanism, a shaft, a pulley freely rotatable thereon and having an inner clutch face, a split clutch ring located about said shaft and within said pulley, an arm secured to said shaft and having the outer end interposed between the split ends of the clutch ring, a member detachably secured to the arm and adapted to prevent axial displacement of the ring relative to the arm, a recess, a part of which is arcuate in contour, formed in a face of said arm adjacent the ring, a lever having a portion thereof formed upon the arc of said recess and fitting therein, said portion having a lip engaging the inner face and a shoulder engaging the outer face of the arm to prevent displacement therefrom, said lever further having a portion extending adjacent said shaft, and a cone slidably carried on the shaft and adapted to actuate the lever, movement of said lever serving to rotate the portion thereof in the recess and to cause a part thereof to move out of the recess against the split ring, thereby expanding the split ring and causing it to engage the pulley.

Signed at Elkhart, Indiana, this 22nd day of June, 1921.

DANIEL H. HERBSTER.
DANIEL E. STAIR.